Aug. 19, 1969

J. PERINA 3,461,511

FASTENING APPARATUS

Filed Jan. 12, 1968

INVENTOR
JOSEPH PERINA

BY Pennie, Edmonds, Morton,
Taylor & Adams

ATTORNEYS

United States Patent Office 3,461,511
Patented Aug. 19, 1969

3,461,511
FASTENING APPARATUS
Joseph Perina, Cold Spring Harbor, N.Y., assignor to American Velcro, Inc., a corporation of New Hampshire
Filed Jan. 12, 1968, Ser. No. 697,395
Int. Cl. F16g 3/00, 17/04
U.S. Cl. 24—31   4 Claims

ABSTRACT OF THE DISCLOSURE

Fastening apparatus for releasably joining ends of belts including a first member secured to an end of one belt having a plurality of hooking elements on its outwardly facing surfaces and a second member secured to an end of another belt, the second member including two spaced apart portions having a plurality of complementary hooking elements on their inwardly facing surfaces, the first member being receivable between the portions of the second member and hooking elements of the first member being engageable with complementary hooking elements of the second member when the respective members are forced together in face-to-face relationship.

Background of the invention

This invention relates to an apparatus for releasably joining opposite ends of a belt. More particularly, this invention relates to a fastener construction wherein means are provided releasably to join the opposite ends of a belt of the type used to transmit power between pulleys.

Power transmission belts have been widely employed in the mechanical art for centuries. In many instances these belts are of unitary construction but for some applications it is desirable to employ a belt which includes a severable connection between opposite ends. The severable construction is particularly suitable for facilitating the installation and removal of power transmission belts.

Conventional belt fasteners include a set of spaced apart metal loops secured to each free end of the belt and arranged so that the loops on one free end fit between the loops on the other free end. The free ends of the belt are secured to each other by a pin which is passed through the intermeshed sets of loops. Conventional fasteners are difficult to use because of the tedious process of aligning the sets of metal loops when the belt is under tension and the use of metal not only contribuites to noisy operation but also has an adverse effect on the dynamic characteristics of the belt. Furthermore, no other presently available fastener provides convenience of operation and a minimum of interference with the operation of the power transmission belt.

Summary of the invention

The fastening apparatus of the present invention is particularly suitable for releasably joining ends of belts and comprises a first fastening member secured to an end of a first belt having first and second outwardly facing surfaces defined by a plurality of upstanding hooking elements of flexible resilient material. A second fastening member is secured to an end of a second belt. The second fastening member includes first and second spaced apart portions which have inwardly facing surfaces defined by a plurality of upstanding complementary hooking elements of flexible resilient material. The first fastener member is receivable between the first and second portions of the second fastening member and when the fastening members are forced together in face-to-face relationship, a large number of hooking elements on the first and second outwardly facing surfaces of the first fastening member are engageable with a large number of complementary hooking elements on the respective inwardly facing surfaces of the first and second spaced apart portions of the second fastening member. The bond so constituted resists separation but is readily separable by peeling forces applied substantially normal to the interfacial plane of engagement. The present invention may also be employed to join together opposite ends of a single belt.

The present invention utilizes hook and loop fasteners such as those described in U.S. Patents Nos. 2,717,437 and 3,009,235 which include separable members each comprising a sheet of woven synthetic material having raised loop threads wherein the loops of one tape member are cut at their outer extremity to form hooks while the loops of the other tape member remain uncut. Metallic hook and loop fasteners may be provided for extreme high and low temperature applications. It is also contemplated that a given member may comprise both hooks and loops. Where the two members of the fasteners are pressed together in face-to-face relationship, there is substantial engagement of hook threads with loop threads. A considerable effort must be applied to separate the members unless they are peeled apart. In that the event, the members may be separated quite easily.

The present invention has the advantages of durability and convenience of operation and at the same time provides a joint which is as flexible as the remainder of the belt. In addition, the present fastening apparatus does not interfere with the performance of the belt because it provides a joint which is of substantially the same cross-sectional thickness as that of the belt.

Description of the preferred embodiment

Figure 1:
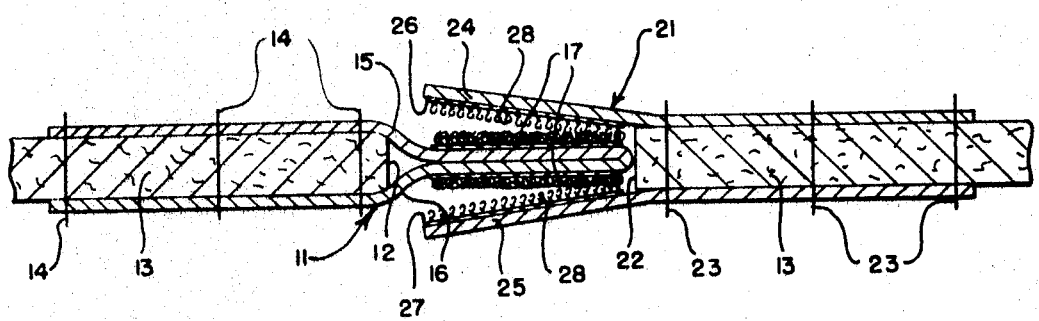
FIG. 1 is an enlarged cross-section of the present fastening apparatus secured to the opposite ends of a power transmission belt.

Fastening apparatus of the present invention comprises a first fastening member 11 which is secured to either surface of one end 12 of a belt 13 by stitching 14 or other suitable means. The first fastening member 11 has first and second outwardly facing surfaces 15, 16 which are defined by a plurality of upstanding hooking elements 17 of flexible resilient material. The hooking elements 17 are raised loop threads composed of a synthetic material such as superpolyamide or a suitable metal which are closed loops as shown in the present embodiment but which may be cut at their outer extremities to form hooks.

A second fastening member 21 is secured to either surface of another end 22 of the belt 13 by stitching 23 or other suitable means. The second fastening member 21 includes first and second spaced apart portions 24, 25 each of which has an inwardly facing surface 26, 27 respectively, defined by a plurality of upstanding complementary hooking elements 28 of flexible resilient material. The complementary hooking elements 28 are raised loop threads composed of a synthetic material such as superpolyamide or a suitable metal which are cut at their outer extremities to form hooks as shown in the present embodiment or may be closed loops. While hook type hooking elements 28 have been provided on the inwardly facing surfaces 26, 27 of the first and second spaced apart portions 24, 25 of the second fastening member 21 and loop type hooking elements have been provided on the first and second outwardly facing surfaces 15, 16 of the first fastening member 11, it is intended that they may be interchanged and thus hooks provided on the first fastening member 11 and loops on the second fastening member 21. In fact, it is contemplated that a given surface may comprise both hook type and loop type hooking elements.

As shown in FIG. 1, the outwardly facing surfaces 15, 16 of the first fastening member 11 are receivable between the first and second spaced apart portions 24, 25 of the second fastening member 21. When the fastening members 11, 21 are aligned in this manner, the inwardly facing surfaces 26, 27 of the second fastening member 21 and the respective outwardly facing surfaces 15, 16 of the first fastening member 11 are forced together in face-to-face relationship causing a large number of hooking elements 17 on the first fastening member 11 to engage a large number of complementary hooking elements 28 on the second fastening member 21. The elements 17, 28, so engaged, constitute a bond which secures the ends 12, 22 of the belt 13 and resists separation. However, the elements 17, 28 may be separated readily by peeling forces applied substantially normal to the interfacial planes of engagement.

Figure 2:
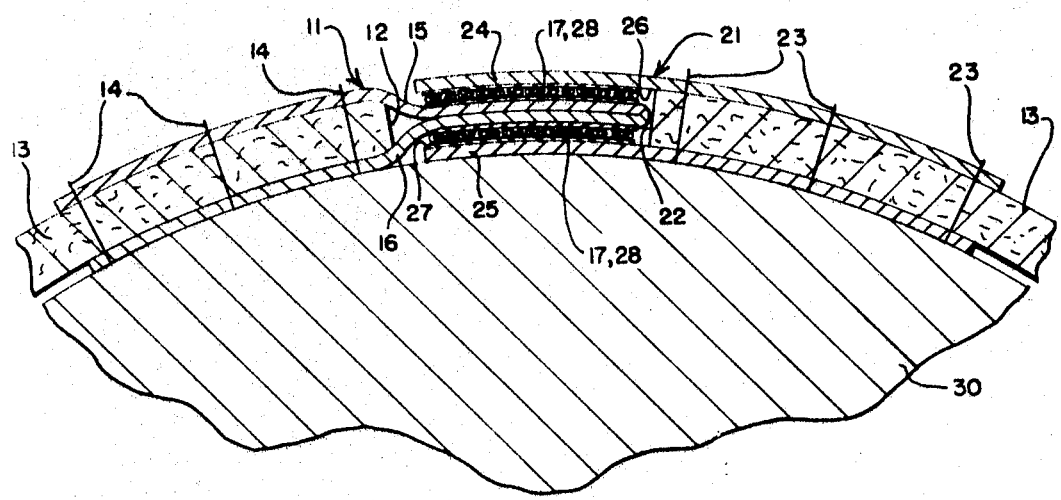
FIG. 2 is an enlarged cross-section of the present fastening apparatus in flexure on over a pulley.

The present fastening apparatus has a flexibility comparable to that of the belt and an aggregate cross-sectional thickness of the first and second fastening members 11, 21 when joined in face-to-face relationship as shown in FIG. 2 substantially equal to the cross-sectional thickness of the belt 13. These attributes permit quiet, efficient operation. Additionally, because the fastening elements 17, 28 are not easily separated by forces tangential to the interfacial plane of engagement, the fastening apparatus has great tensile strength and, as shown in FIG. 2, the bond between the fastening elements 17, 28 is continually strengthened during operation by forces acting normal to the interfacial planes of engagement as the fastening members pass over a pulley 30. This feature makes the present fastening apparatus particularly suitable for sinusoidal belt drives in which a belt passes sequentially over a first pulley and under a second. It is further contemplated that the present fastening apparatus may be employed to join together free ends of two or more belts as well as the opposite ends of a single belt.

I claim:

1. Fastening apparatus for releasably joining ends of belts comprising a first fastening member secured to an end of a first belt, the first fastening member having first and second outwardly facing surfaces defined by a plurality of upstanding hooking elements of flexible resilient material, and a second fastening member secured to an end of a second belt, the second fastening member secured to an end of a second belt, the second fastening member including first and second spaced-apart portions, each portion having an inwardly facing surface defined by a plurality of upstanding complementary hooking elements of flexible resilient material, the first and second outwardly facing surfaces of the first fastening member being receivable between the first and second portions of the second fastening member, a large number of hooking elements on the first and second outwardly facing surfaces of the first fastening member being engageable with a large number of complementary hooking elements on the respective inwardly facing surfaces of the first and second spaced-apart portions of the second fastening member when the fastening members are forced together in face-to-face relationship, the aggregate cross-sectional thickness of the first and second fastening members as engaged being substantially equal to the cross-sectional thickness of the belt and the hooking elements and complementary hooking elements constituting a bond which resists separation but which is readily separable by peeling forces applied substantially normal to the interfacial plane of engagement.

2. Fastening apparatus according to claim 1 wherein the belt ends to be joined are opposite ends of a single belt.

3. A continuous belt having at least one seam joined together by the fastening apparatus according to claim 1.

4. Fastening apparatus according to claim 1 wherein the bond between the first and second fastening members is strengthed by compressive forces exerted substantially normal to the interfacial planes of engagement when the fastening members traverse over a pulley.

References Cited

UNITED STATES PATENTS

| 1,638,073 | 8/1927 | Van Heusen. | |
| 3,127,256 | 3/1964 | Boylan | 24—31 X |
| 3,196,511 | 7/1965 | Kintner | 24—204 |
| 3,279,090 | 10/1966 | Harper | 24—38 X |

FOREIGN PATENTS

| 834,209 | 11/1938 | France. |
| 589,803 | 3/1959 | Italy. |

BERNARD A. GELAK, Primary Examiner

U.S. Cl. X.R.

24—204